US009087289B2

(12) United States Patent
Obayashi

(10) Patent No.: US 9,087,289 B2
(45) Date of Patent: Jul. 21, 2015

(54) IMAGE PROCESSING METHOD AND APPARATUS FOR PRINTING MONOCHROME OR COLOR IMAGES ON A MEDIUM

(71) Applicant: CANON KABUSHIKI KAISHA, Tokyo (JP)

(72) Inventor: Masaaki Obayashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/963,939

(22) Filed: Aug. 9, 2013

(65) Prior Publication Data

US 2014/0055797 A1    Feb. 27, 2014

(30) Foreign Application Priority Data

Aug. 21, 2012  (JP) .................................. 2012-182638

(51) Int. Cl.
*H04N 1/60* (2006.01)
*G06K 15/02* (2006.01)
*H04N 1/46* (2006.01)

(52) U.S. Cl.
CPC ............ *G06K 15/1878* (2013.01); *H04N 1/465* (2013.01)

(58) Field of Classification Search
None
See application file for complete search history.

(56) References Cited

U.S. PATENT DOCUMENTS

| 5,297,058 | A | * | 3/1994 | Samworth | 382/167 |
|---|---|---|---|---|---|
| 6,172,681 | B1 | * | 1/2001 | Ueda | 345/589 |
| 6,340,975 | B2 | * | 1/2002 | Marsden et al. | 345/590 |
| 6,459,501 | B1 | | 10/2002 | Holmes | |
| 6,701,011 | B1 | * | 3/2004 | Nakajima | 382/167 |
| 7,397,572 | B1 | * | 7/2008 | Horii | 358/1.13 |
| 7,447,350 | B2 | | 11/2008 | Akaishi | |
| 7,599,096 | B2 | | 10/2009 | Yoshida | |
| 7,636,178 | B2 | * | 12/2009 | Nakatani et al. | 358/1.9 |
| 7,729,019 | B2 | | 6/2010 | Yamada et al. | |
| 7,869,092 | B2 | * | 1/2011 | Nakatani et al. | 358/1.9 |
| 8,310,723 | B2 | * | 11/2012 | Nakatani et al. | 358/1.9 |
| 8,390,889 | B2 | * | 3/2013 | Iguchi | 358/3.01 |
| 2004/0227977 | A1 | * | 11/2004 | Yoshida | 358/3.01 |
| 2006/0012809 | A1 | * | 1/2006 | Shimada | 358/1.9 |
| 2007/0236758 | A1 | * | 10/2007 | Ariga | 358/518 |
| 2008/0055679 | A1 | * | 3/2008 | Yoshida | 358/518 |
| 2008/0123948 | A1 | * | 5/2008 | De Baer | 382/167 |
| 2011/0116137 | A1 | * | 5/2011 | Uratani et al. | 358/3.23 |
| 2011/0170142 | A1 | * | 7/2011 | Ito et al. | 358/3.24 |
| 2012/0050766 | A1 | * | 3/2012 | Saiki | 358/1.9 |
| 2014/0055797 | A1 | * | 2/2014 | Obayashi | 358/1.9 |

FOREIGN PATENT DOCUMENTS

JP    2004-142423 A    5/2004

OTHER PUBLICATIONS

U.S. Appl. No. 13/963,929, filed Aug. 9, 2013, by Takahisa Akaishi.

* cited by examiner

*Primary Examiner* — Dung Tran
(74) *Attorney, Agent, or Firm* — Fitzpatrick, Cella, Harper & Scinto

(57) ABSTRACT

Acquired monochrome image data is converted into color image data using a first lookup table in which gray line gradations are mapped to coordinate values in a color space. Image processing corresponding to printing is executed for the converted color image data, and the color image data that is subjected to the image processing is converted into color material data using a second lookup table in which the coordinate values in the color space are mapped to coordinate values in a color material color space.

22 Claims, 8 Drawing Sheets

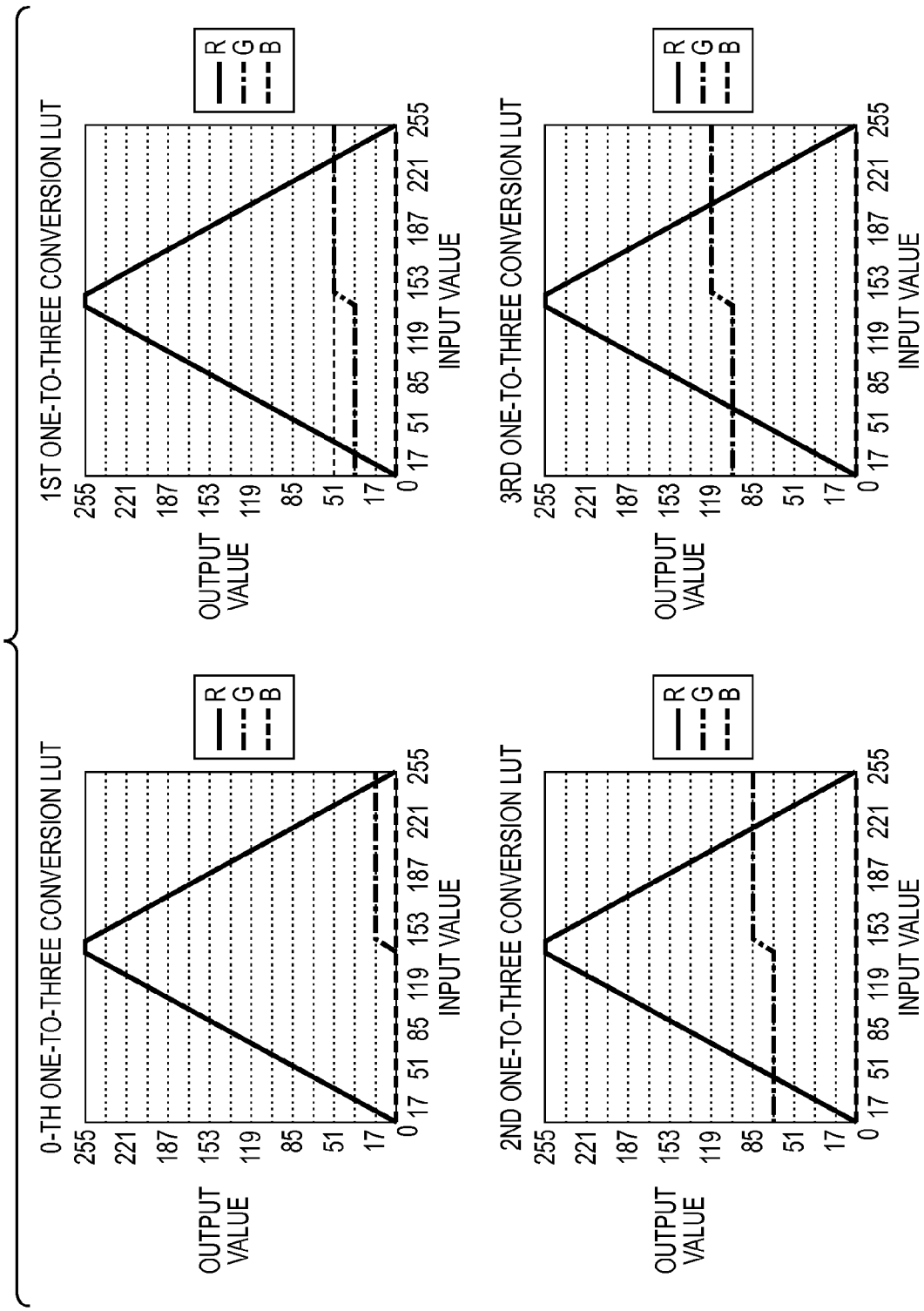

IMAGE PROCESSING METHOD AND APPARATUS FOR PRINTING MONOCHROME OR COLOR IMAGES ON A MEDIUM

BACKGROUND OF THE INVENTION

1. Field of the Invention

The present invention relates to an image processing apparatus, and an image processing method for performing image processing corresponding to printing, and a storage medium storing a program.

2. Description of the Related Art

In recent years, color printers capable of printing monochrome images have become widely known due to the arrival of ink jet printers that include multicolor ink such as grey ink. Generally, with a color printer, when a color image is developed into color material colors, color material color development processing is performed by referencing a three-dimensional lookup table (3DLUT). U.S. Pat. No. 6,459,501 discloses a method of processing monochrome image data using a nearly achromatic color reproduction region (small gamut), which is a restricted gamut.

Generally, a monochrome image requires tone to be expressed more finely compared to a color image. Because of this, a greater degree of tone reproduction control is needed for monochrome image data than for color image data. In view of this, with color material color development processing by a printer capable of printing a monochrome image, it is necessary to implement, in the 3DLUT, more grid points than the number of grid points needed for color image processing.

In U.S. Pat. No. 6,459,501, image quality is improved by using a small gamut obtained by restricting the gamut, but since the number of grid points is the same as in color image processing, the performance of tone reproduction control is also the same as in color image processing. Also, it is conceivable for monochrome image processing that implements a larger number of grid points to be configured separately from color image processing. However, the provision of a hardware configuration separate from that of color image processing causes an increase in circuit size. Also, in color image processing, it is conceivable for a larger number of grid points to be implemented to match the image quality of monochrome image data with a high level of tone reproduction control. However, an increase in the number of grid points in the 3DLUT will end up causing an increase in circuit size. Also, the amount of memory increases as well with respect to processing performed by software, and therefore the efficiency of printing processing decreases.

SUMMARY OF THE INVENTION

An aspect of the present invention is to eliminate the above-mentioned problems with the conventional technology. The present invention provides an image processing apparatus, and an image processing system for improving the efficiency of printing processing with respect to image data, and a storage medium for storing a program.

The present invention in its first aspect provides an image processing apparatus comprising: a setting unit configured to set a monochrome mode for printing a monochrome image on a printing medium or a color mode for printing a color image on the printing medium; a conversion unit configured to, in a case where the monochrome mode is set by the setting unit, convert monochrome image data indicating monochrome image gradations in signal values of a color element having a predetermined number of gradations, into intermediate image data expressed in sets of signal values of a plurality of color elements; and a transfer unit configured to transfer the intermediate image data obtained by conversion performed by the conversion unit to a determination unit configured to determine a color material amount for printing the monochrome image on a printing medium, based on a correspondence relationship between signal values of the plurality of color elements and color material amounts for printing the monochrome image on the printing medium.

According to the present invention, the efficiency of printing processing with respect to image data can be improved.

Further features of the present invention will become apparent from the following description of exemplary embodiments with reference to the attached drawings.

BRIEF DESCRIPTION OF THE DRAWINGS

FIG. 8 is a diagram showing an example of a one-to-three conversion table.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that identical constituent elements will be denoted by the same reference signs, and redundant descriptions thereof will be omitted.

Embodiment 1

Configuration of Image Processing System

Figure 1:
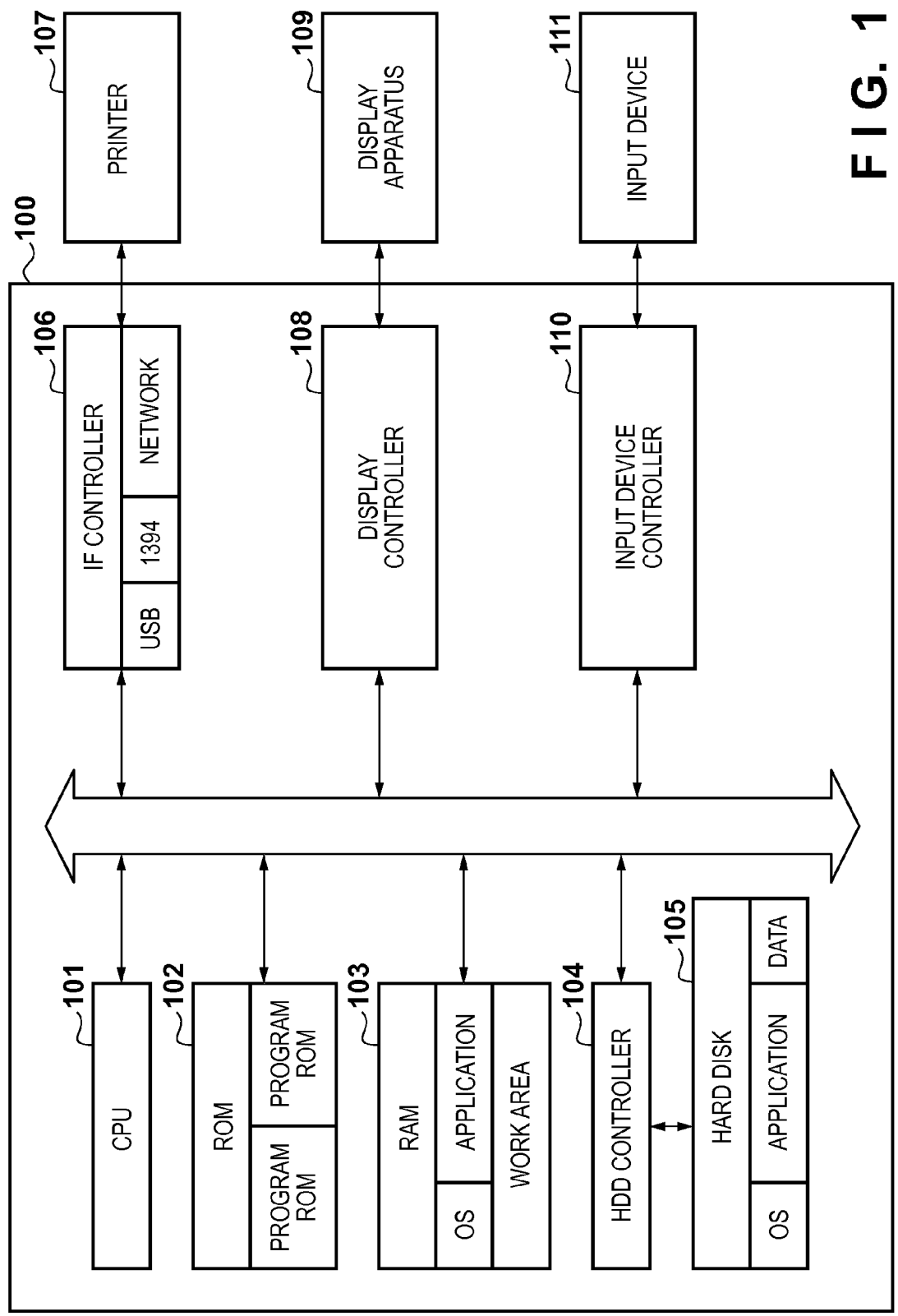
FIG. 1 is a diagram showing a configuration of an image processing system.

FIG. 1 is a diagram showing a configuration of an image processing system for executing pattern printing for a monochrome image according to embodiments of the present invention. A CPU 101 performs overall control of a host computer 100. A ROM 102 stores programs for controlling controllers of the host computer 100, and also stores data used by those programs. An HDD controller 104 performs data control such as data writing/readout with respect to a hard disk 105. The hard disk 105 stores an OS and an application that run on the host computer 100, as well as data used by that application. A RAM 103 stores the OS and the application loaded from the hard disk 105 via the HDD controller 104. The OS and the application loaded to the RAM 103 are executed by the CPU 101. Also, the RAM 103 is used as a work area as well when applications are running.

A printer 107 is a color printer that uses light cyan (Lc), light magenta (Lm), dark gray (Gy), and light gray (Lg) as color materials in addition to CMYK (cyan, magenta, yellow, black). An ink jet type of ink jet printing apparatus for example may be used as the color printer. An interface controller 106 performs reception and transmission of data between the printer 107 and the host computer 100. When a user executes a print command in an application, print data is generated using a printer driver stored in the hard disk 105, and the print data is transmitted to the printer 107 via the interface controller 106. The print data is RGB data or color material color data for example. A display controller 108 controls a display apparatus 109. Under control of the CPU 101, an input device controller 110 accepts input of an instruction from the user of the host computer 100 given using an input device 111. The input device 111 is a keyboard or a pointing device for example. The user of the host computer 100 can perform interactive operations in the application running on the host computer 100 by using the display apparatus 109 and the input device 111

Example of Image Processing

The user starts an application for executing various types of image processing, such as pattern printing, using the display apparatus 109 and the input device 111. The application is stored in the hard disk 105 for example. For example, the CPU 101 acquires monochrome image data, which is to be the printing target. The CPU 101 may acquire the monochrome image data directly from an external device, or it may acquire the monochrome image data by receiving input of RGB image data and converting that image data to grayscale using a predetermined RGB ratio.

Figure 2:
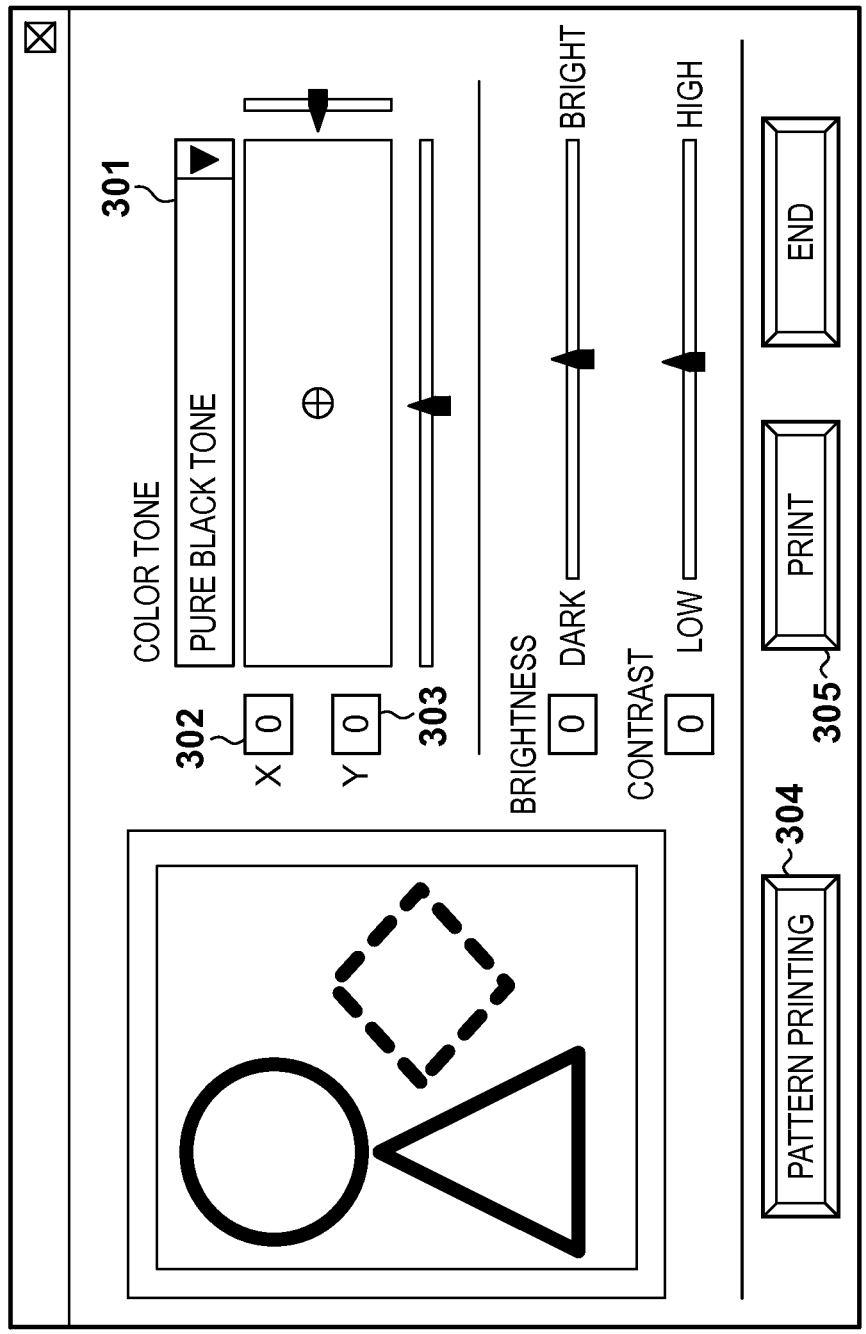
FIG. 2 is a diagram showing an example of a print setting screen for monochrome image data.

FIG. 2 is a diagram showing an example of a GUI displayed by an application for performing pattern printing based on monochrome image data. With the setting screen in FIG. 2, the user can set central parameters for color tone, brightness, contrast, and the like for when changing multiple parameter values in pattern printing. A list box 301 is used when the user selects a color tone preset. Presets such as "pure black tone", "warm black tone", and "cool black tone" are displayed in a user-selectable manner in the list box 301. Furthermore, to allow the user to perform color tone adjustment, the setting screen displays a parameter X 302 for adjusting the color tone in a yellow-blue direction, and a parameter Y 303 for adjusting the color tone in a cyan-red direction. The color tone parameter X 302 and the color tone parameter Y 303 are coordinated with the color tone presets in the list box 301, and when the user changes the color tone preset, the values of the color tone parameter X 302 and the color tone parameter Y 303 also change in coordination. When the user presses a pattern printing button 304, an advanced setting screen (not illustrated) for parameters to be changed in pattern printing is furthermore opened. Parameters set in the setting screen in FIG. 2 are stored in a data region in the hard disk 105. The CPU 101 reads out the parameters set using the setting screen in FIG. 2 from the data region in the hard disk 105, and generates pattern printing image data and image processing parameters based on the parameter values. The generated pattern printing image data and image processing parameters are transmitted to the printer 107 via the I/F controller 106.

Processing in the Case of a Color Image

Figure 3:
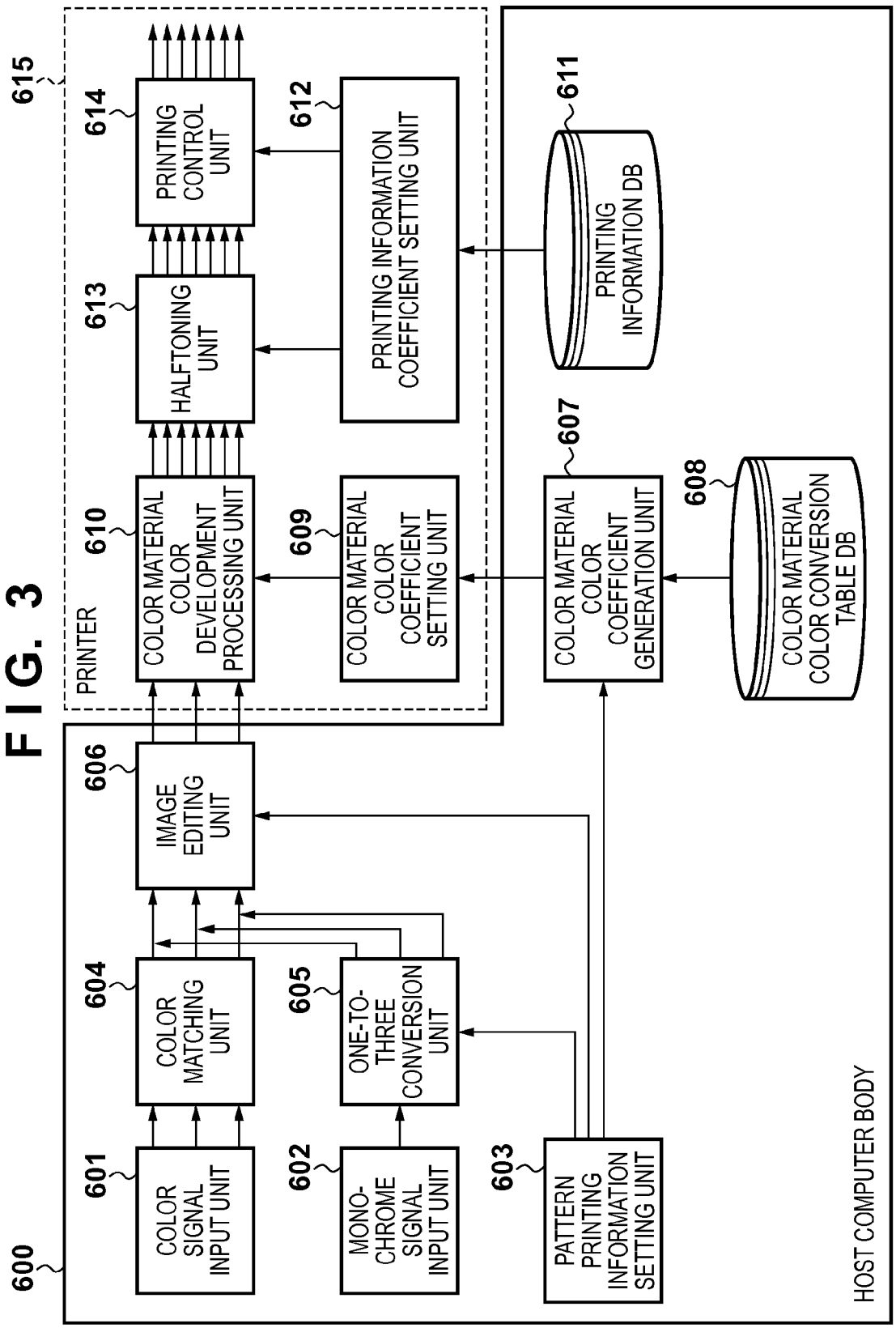
FIG. 3 is a diagram showing a configuration of an image processing unit in the image processing system.

FIG. 3 is a diagram showing a configuration of an image processing unit in an image processing system. Below, in the case of a color image, image data is described as being 24-bit data, each color having 8 bits, and in the case of a monochrome image, image data is described as being 8-bit data. A host computer 600 has, among the constituent elements of an image processing unit, a color signal input unit 601, a monochrome signal input unit 602, a color matching unit 604, an image editing unit 606, a one-to-three conversion unit 605, a pattern printing information setting unit 603, and a color material color coefficient generation unit 607. The host computer 600 also has a color material color conversion table database (DB) 608 and a printing information DB 611. Also, a printer 615 has, among the constituent elements of an image processing unit, a color material color development processing unit 610, a color material color coefficient setting unit 609, a halftoning unit 613, a printing control unit 614, and a printing information coefficient setting unit 612. Although illustrated as described above in FIG. 3, the host computer 600 may further include the color material color development processing unit 610 and the color material coefficient setting unit 609.

First, a case of a color image will be described below. The color signal input unit 601 receives an input of RGB data for a color image (24-bit data, each color being 8 bits), and outputs it to the color matching unit 604. The color matching unit 604 performs color conversion from a standard sRGB space into a device RGB space, for example, by means of a three-dimensional lookup table (3DLUT). In a 3DLUT, color conversion parameters (RGB values) are set as output values on 16 grid points placed at intervals of 17 values for example (in other words, 16×16×16=4096 grid points), and RGB values between grid points are calculated using an interpolation calculation. Color conversion parameters in the 3DLUT change depending on the printing medium and the printing mode, and for example, they are created in advance, stored in the hard disk 105, read out according to need, and set on the grid points. If pattern printing is to be performed, the image editing unit 606 performs layout processing for one piece of image data using multiple pieces of pattern printing image data. If pattern printing is not to be performed, the image editing unit 606 executes enlargement/reduction processing to adjust the image to a desired size.

RGB data in the device RGB space processed by the image editing unit 606, image processing parameters for image processing to be performed by the printer 615, and printer control parameters are transmitted to the printer 615. The color material color development processing unit 610 performs, using the 3DLUT, color conversion of RGB data in the device RGB space into color material color data that corresponds to a color material color space. Here, "color material colors" are eight colors including Lc, Lm, Gy, and Lg, in addition to CMYK. In a 3DLUT in the color material color development processing unit 610, color conversion parameters are also set as output values on 16 grid points placed in intervals of 17 values (4096 grid points), and RGB data between grid points is calculated using an interpolation calculation. The color conversion parameters in the 3DLUT in the color material color development processing unit 610 change depending on the printing medium and printing mode. The color conversion parameters in the 3DLUT are created in advance, stored in the color material color conversion table DB 608 on the hard disk 105, read out by the color material color coefficient setting unit 609 according to need, and set on the grid points for example.

Using an ED method or the like, the halftoning unit 613 binarizes color material color data that has undergone color conversion by the color material color development processing unit 610. Then, the printing control unit 614 executes processing necessary for printing, such as print path resolution, and performs printing on a printing medium. Image processing parameters used by the halftoning unit 613 and the printing control unit 614 also change depending on the printing medium and printing mode used. For example, they are created in advance, stored in the printing information DB 611 on the hard disk 105, read out by the printing information coefficient setting unit 612 according to need, and set in the halftoning unit 613 and the printing control unit 614.

Image processing in the case of a color image was described above. It is also possible to perform image processing on monochrome image data as color image data where R=G=B. However, in general, compared with color images, tone expression is particularly important in monochrome images. Accordingly, if monochrome image data is converted into color image data and undergoes image processing according to the aforementioned configuration, it is necessary for the number of grid points in the 3DLUT to be increased from 16 to 32 or 64, and for fine control to be enabled for the tone characteristics in printing. However, as a result of this, the circuit size increases, causing an increase in product cost.

Processing in the Case of a Monochrome Image

In view of this, with regards to pattern printing of a monochrome image (printing in monochrome mode), image processing is performed as follows in the present embodiment. First, the monochrome signal input unit 602 receives an input of monochrome image data that is 8-bit data, and outputs it to the one-to-three conversion unit 605. Also, the pattern printing information setting unit 603 reads out parameters for pattern printing set in the setting screen in FIG. 2 from the hard disk 105, and sets pattern printing information, which is information that is needed for pattern printing. Here, pattern printing information is number of pattern images, pattern image arrangement, pattern image size, color adjustment parameters regarding the pattern images, and information on the storage position of the color material color conversion table in the 3DLUT regarding the pattern images. The information on the storage position of the color material color conversion table in the 3DLUT regarding the pattern images will be described later. The pattern printing information setting unit 603 transmits pattern printing information to the one-to-three conversion unit 605, the image editing unit 606, and the color material color coefficient generation unit 607.

The one-to-three conversion unit 605 receives an input of monochrome image data and converts the gray tone values on the gray lines into RGB signal values in a color space with use of a one-to-three conversion table. The converted RGB signal values correspond to the RGB signal values of input values in the 3DLUT in the downstream color material color development processing unit 610. Also, the one-to-three conversion table will be described later. The conversion performed by the one-to-three conversion unit 605 is performed once for each pattern image. The image editing unit 606 receives an input of one piece of RGB data (intermediate image data) converted by the one-to-three conversion unit 605 for each pattern image and composites the pattern images into one piece of image data in accordance with the sizes of the pattern images and the arrangement of the pattern images, which were set by the pattern printing information setting unit 603.

Figure 4B:
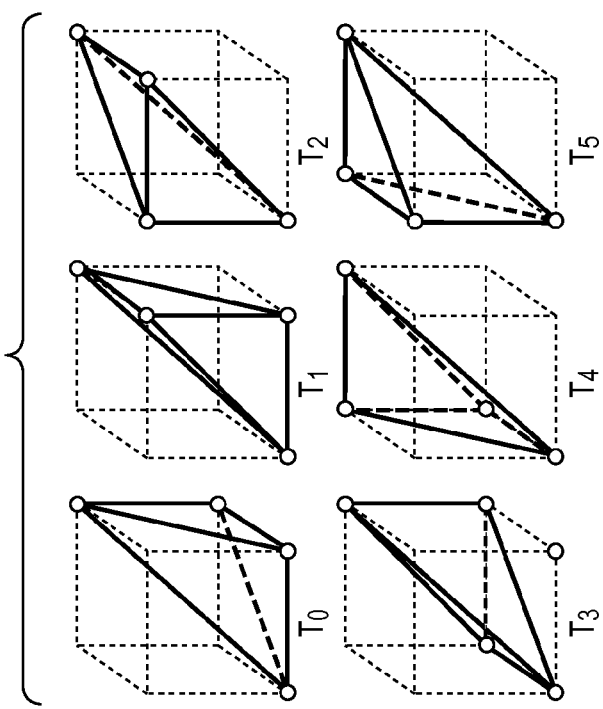
FIGS. 4A and 4B are diagrams for describing positions of input values.
Figure 4A:
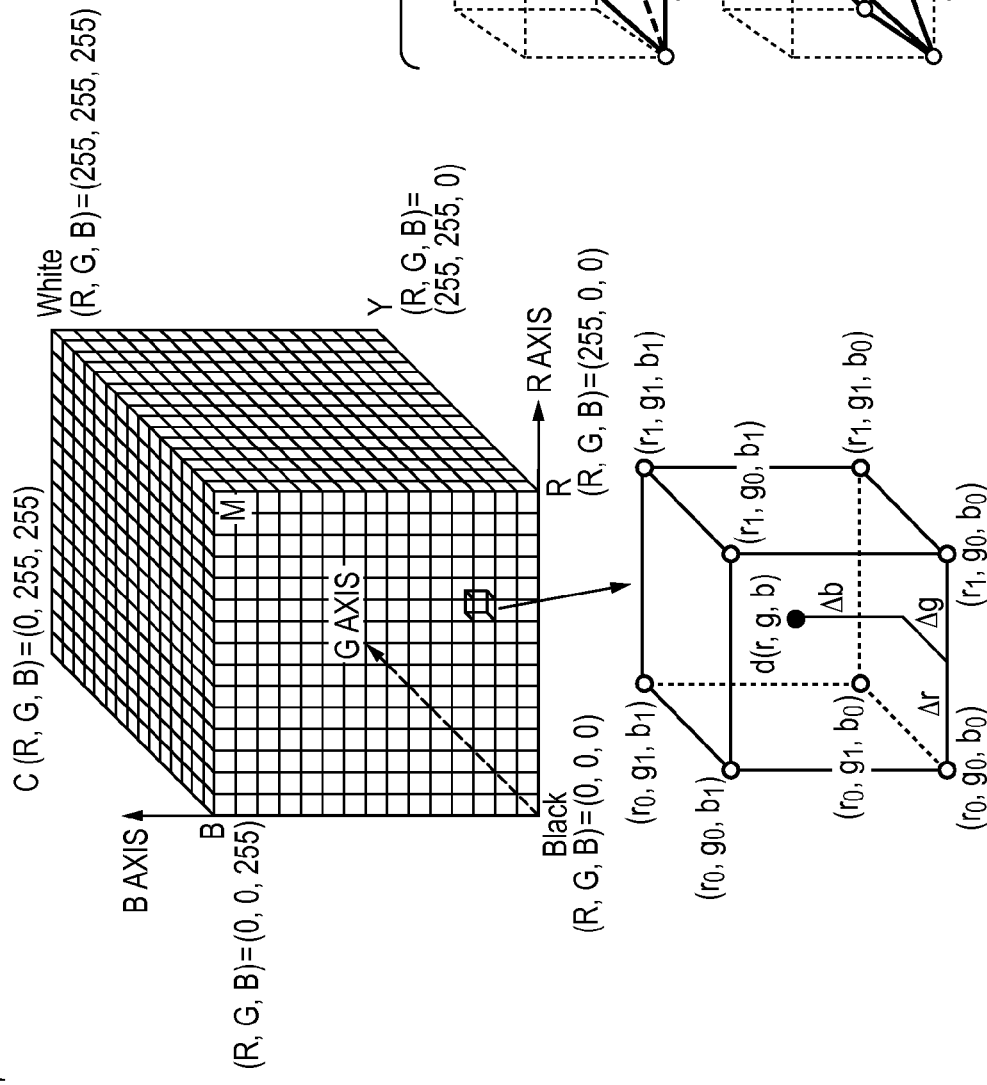
Figure 5:
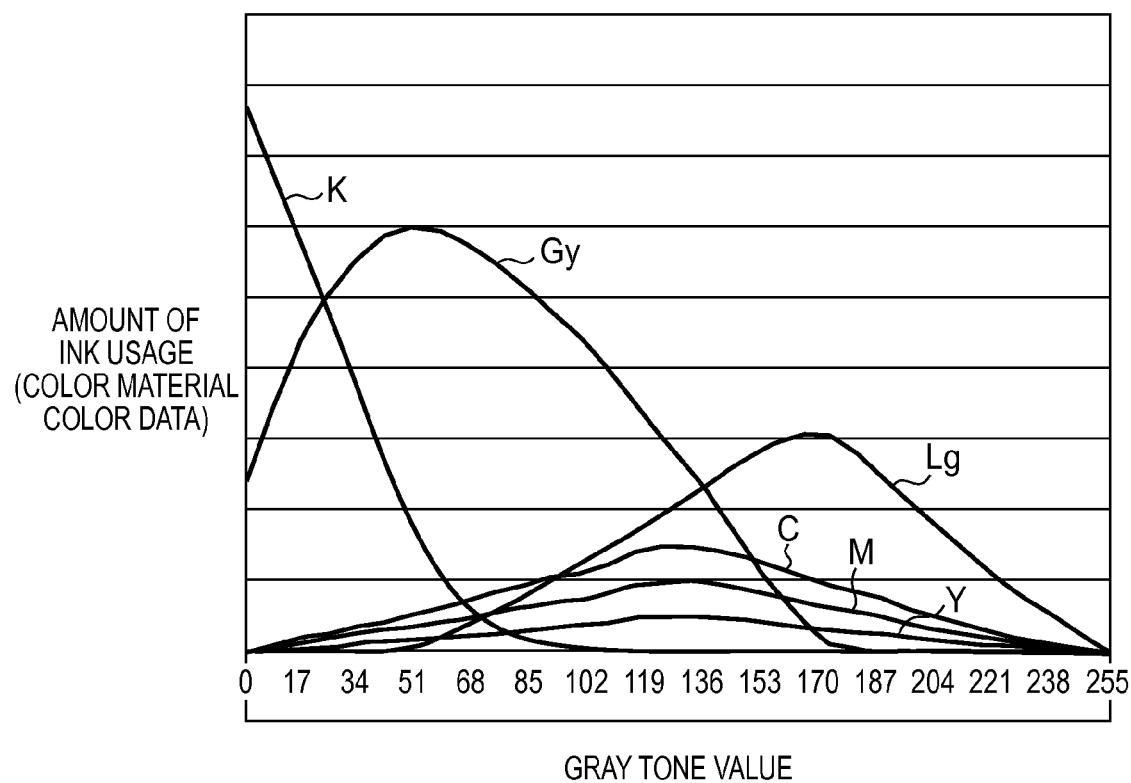
FIG. 5 is a diagram showing an example of a 1DLUT.
Figure 6:
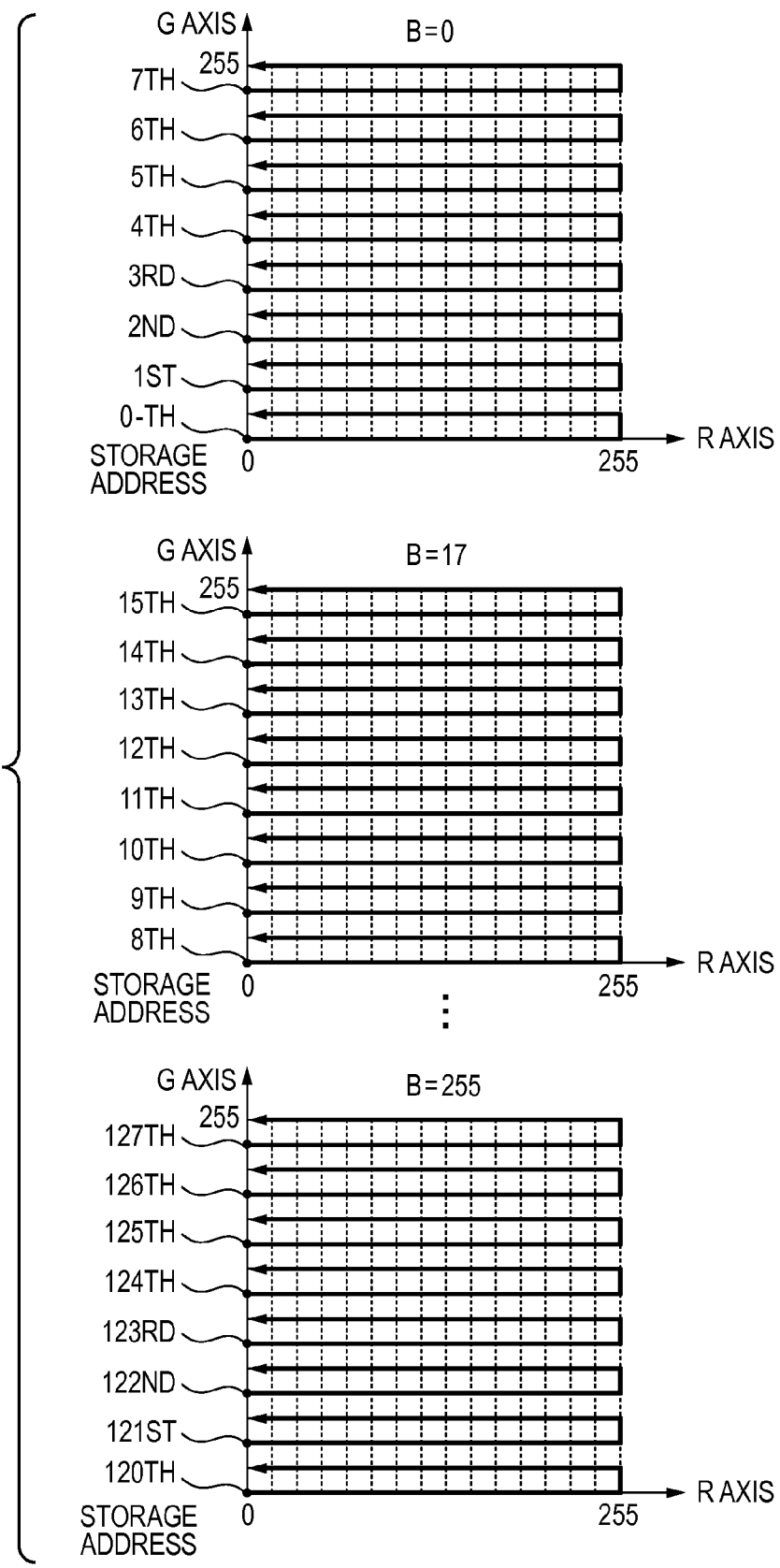
FIG. 6 is a diagram showing an example of the mapping of the 1DLUT to a 3DLUT.

The color material color development processing unit 610 converts the RGB data transmitted from the image editing unit 606 into color material color signals. The color material color signals correspond to the amounts of color material to be used in printing processing. The 3DLUT used at that time has 4096 grid points expressed as 16 grid points for each axis of RGB, as shown in FIG. 4A. The 3DLUT used in the color material color development processing unit 610 is the same as that in conventional technology in terms of the number of grid points. However, the color material color data values set by the color material color coefficient setting unit 609 are mapped (stored) as output values on the coordinate points of the RGB signal values transmitted from the image editing unit 606. The aforementioned "information on the storage position of the color material color conversion table in the 3DLUT" refers to the mapping in the 3DLUT of color material color data to coordinate points expressed by RGB signal values transmitted from the image editing unit 606. In the present embodiment, RGB signal values transmitted from the image editing unit 606 are values following the direction of the arrow shown in the 0-th line in FIG. 6. FIG. 6 shows an example of a second lookup table and a second correspondence relationship in the present embodiment. In other words, it means that the gray tone value is converted by the one-to-three conversion unit 605 so as to be such an RGB signal value. Also, color material color data values are mapped to the coordinate points in the direction of the arrow shown in the 0-th line in FIG. 6. In other words, whereas gray tone values and color material data are mapped to each other in a one-dimensional lookup table (1DLUT) as shown in FIG. 5, a gray tone value is first converted into RGB data with the one-to-three conversion table. Then, furthermore, it is converted into color material color data corresponding to RGB signal values using the 3DLUT. According to this configuration, in the present embodiment, the configuration of color material color conversion processing can be the same for a monochrome image and a color image. Then, for example, in image processing such that pattern images are composited into one piece of data, RGB data is handled rather than color material color data, and therefore the amount of data can also be reduced. Also, although described later, if interpolation processing in a normal 3DLUT is performed during color material color development processing by the color material color development processing unit 610, it is possible to obtain results that are the same as with interpolation processing in a conventional 1DLUT. Accordingly, tone control similar to that in conventional technology can be performed for a monochrome image. Color material color data resulting from color conversion by the color material color development processing unit 610 undergoes printing processing via the halftoning unit 613 and the printing control unit 614, similarly to the case of the color image.

The color material color coefficient generation unit 607 generates a 3DLUT to be used by the color material color development processing unit 610 in accordance with color adjustment parameters for pattern images set by the pattern printing information setting unit 603, and in accordance with the information on the storage position of the color material color conversion table in the 3DLUT. The color material color coefficient generation unit 607 acquires, from the color material color conversion table DB 608, the color material color conversion table for monochrome images that corresponds to the color tone (X, Y) designated on the setting screen in FIG. 2. The color material color conversion table DB 608 is a color material color conversion table (1DLUT) that corresponds to FIG. 5 for example, and it stores all color tones that can be designated on the setting screen in FIG. 2 for each printing medium. The color material color coefficient generation unit 607 maps output values (color material color signal values) corresponding to gray tone values in the color material color conversion table acquired from the color material color conversion table DB 608, in an RGB space according to the storage position information set by the pattern printing information setting unit 603. It was described that the color material color conversion table 608 stores all color tones that can be designated on the setting screen in FIG. 2. However, a color material color conversion table that corresponds to color tones designated on the setting screen in FIG. 2 may be obtained by performing an interpolation calculation based on color material color conversion tables stored in advance in the color material color conversion table DB 608. The 3DLUT generated by the color material color coefficient generation unit 607 in the host computer 600 is transmitted to the color material color coefficient setting unit 609 in the printer 615. Then, the color material color coefficient setting unit 609 sets the transmitted 3DLUT in the color material color development processing unit 610.

Operation by the Color Material Color Coefficient Generation Unit

Conventionally, in the case where color material color development processing is performed with respect to monochrome image data in which the input values are gray tone values (gradation values) (i.e., the input value is 1-channel), color material color development processing is performed using a 1DLUT for conversion into color material color data, and subsequently, halftone processing is performed. Thus, the configuration was separate from that of color material color development processing performed by a 3DLUT with respect to color image data, and therefore the circuit size was bigger, which influenced product cost.

In the present embodiment, the one-to-three conversion unit 605, the color material color coefficient generation unit 607, and the color material color development processing unit 610, which is used for color image data, are combined, and color material color development processing is performed for monochrome image data. In other words, in the present embodiment, color material color development processing for monochrome data (8 bits, 256 gradations) is not performed using a 1DLUT, and is instead performed using the color material color conversion table (a 3DLUT) in the color material color development processing unit 610. As a result, it is an aim of the present invention to prevent an increase in circuit size caused by having a separate configuration for monochrome image data as in conventional technology. In the present embodiment, the term "channel" refers to an image data signal, "one channel" meaning a monochrome image signal, "3 channels" meaning an RGB signal, and "4 channels" meaning a CMYK signal for example. Besides RGB and CMYK, it is possible to use YCbCr, Lab, XYZ, or the like to express other image data signals.

Generation of 3DLUT in the Color Material Color Development Processing Unit 610

Next, the generation of a 3DLUT used by the color material color development processing unit 610 will be described. A 1DLUT conventionally used for monochrome image data, such as that shown in FIG. 5, maps color material color data to gray tone values (gradation values). In the present embodiment, the color material color coefficient generation unit 607 maps gray tone values (gradation values) to an RGB space. At that time, the color material color coefficient generation unit 607 maps the gray tone values (gradation values) in FIG. 8 to consecutive adjacent grid points in the RGB space in order. Here, "consecutive adjacent grid points" means grid points that are in a positional relationship such that, in the case of calculating an output value corresponding to an input value that is on a line segment that connects two adjacent grid points in the RGB space, interpolation calculation is performed based on only those two grid points.

For example, in this description, interpolation calculation for a 3DLUT is performed using tetrahedral interpolation. With tetrahedral interpolation, first, it is specified which cube an input value d (r, g, b) will be included in by performing a comparison with the grid points in the 3DLUT. FIG. 4A shows a positional relationship between the grid points of the specified cube and the input value d. An output value (r', g', b') of the input value d is calculated using Equation 1.

$$(r',g',b')=(r0',g0',b0')+c1\times\Delta r/(r1-r0)+c2\times\Delta g/(g1-g0)+c3\times\Delta b/(b1-b0) \quad (1)$$

Here, (r0', b0', b0') is the output value of the grid point (r0, g0, b0). Also, coefficients c1 to c3 are calculated as described below, depending on which of the six tetrahedrons (T0 to T5) shown in FIG. 4B the output value d is included in. Here, (R', G', B') rxbxgx expresses an output value on the grid point (rx, gx, bx).

If input value d is included in tetrahedron T0, i.e., if $\Delta r/(r1-r0) \geq \Delta g/(g1-g0) \geq \Delta b/(b1-b0)$:
  c1=(R', G', B') r1g0b0—(R', G', B') r0g0b0
  c2=(R', G', B') r1g1b0—(R', G', B') r1g0b0
  c3=(R', G', B') r1g1b1—(R', G', B') r1g1b0

If input value d is included in tetrahedron T1, i.e., if $\Delta r/(r1-r0) \geq \Delta b/(b1-b0) \geq \Delta g/(g1-g0)$:
  c1=(R', G', B') r1g0b0—(R', G', B') r0g0b0
  c2=(R', G', B') r1g1b1—(R', G', B') r1g0b1
  c3=(R', G', B') r1g0b1—(R', G', B') r1g0b0

If input value d is included in tetrahedron T2, i.e., if $\Delta g/(g1-g0) \geq \Delta r/(r1-r0) \geq \Delta b/(b1-bg0)$:
  c1=(R', G', B') r1g1b0—(R', G', B') r0g1b0
  c2=(R', G', B') r0g1b0—(R', G', B') r0g0b0
  c3=(R', G', B') r1g1b1—(R', G', B') r1g1b0

If input value d is included in tetrahedron T3, i.e., if $\Delta g/(g1-g0) \geq \Delta b/(b1-b0) \geq \Delta r/(r1-r0)$:
  c1=(R', G', B') r1g1b0—(R', G', B') r0g1b1
  c2=(R', G', B') r0g1b0—(R', G', B') r0g0b0
  c3=(R', G', B') r0g1b1—(R', G', B') r0g1b0

If input value d is included in tetrahedron T4, i.e., if $\Delta b/(b1-b0) \geq \Delta r/(r1-r0) \geq \Delta g/(g1-g0)$:
  c1=(R', G', B') r1g0b1—(R', G', B') r0g0b1
  c2=(R', G', B') r1g1b1—(R', G', B') r1g0b1
  c3=(R', G', B') r0g0b1—(R', G', B') r0g0b0

If input value d is included in tetrahedron T5, i.e., if $\Delta b/(b1-b0) \geq \Delta g/(g1-g0) \geq \Delta r/(r1-r0)$:
  c1=(R', G', B') r1g1b1—(R', G', B') r0g1b1
  c2=(R', G', B') r0g1b1—(R', G', B') r0g0b1
  c3=(R', G', B') r0g0b1—(R', G', B') r0g0b0

As described above, consecutive adjacent grid points are sets of two grid points such that interpolation calculation can be performed using only two grid points in Equation 1. The following sets of grid points apply to the cases shown in FIG. 4B.

If the input value d is included in the tetrahedron T0: a set of (r0, g0, b0) and (r1, g0, b0), a set of (r0, g0, b0) and (r1, g1, b1), and a set of (r0, g0, b0) and (r1, g1, b0).

If the input value d is included in the tetrahedron T1: a set of (r0, g0, b0) and (r1, g0, b0), a set of (r0, g0, b0) and (r1, g1, b1), and a set of (r0, g0, b0) and (r1, g0, b1).

If the input value is included in the tetrahedron T2: a set of (r0, g0, b0) and (r0, g0, b1), a set of (r0, g0, b0) and (r1, g1, b1), and a set of (r0, g0, b0) and (r1, g0, b1).

If the input value is included in the tetrahedron T3: a set of (r0, g0, b0) and (r0, g1, b0), a set of (r0, g0, b0) and (r1, g1, b1), and a set of (r0, g0, b0) and (r1, g1, b0).

If the input value is included in the tetrahedron T4: a set of (r0, g0, b0) and (r0, g1, b0), a set of (r0, g0, b0) and (r1, g1, b1), and a set of (r0, g0, b0) and (r0, g1, b1).

If the input value is included in the tetrahedron T5: a set of (r0, g0, b0) and (r0, g0, b1), a set of (r0, g0, b0) and (r1, g1, b1), and a set of (r0, g0, b0) and (r0, g1, b1).

In other words, in the case of performing an interpolation calculation with regard to an input value on a line segment of the aforementioned sets of grid points, in the calculation of Equation 1, the coefficient (at least one out of $\Delta r$, $\Delta g$, and $\Delta b$) of a grid point other than the two aforementioned grid points will be zero. Accordingly, in actuality, it will be a calculation of a linear interpolation between two grid points. In the present embodiment, color material color data in the 1DLUT in FIG. 5 is mapped to consecutive grid points in such a positional relationship, in the order of the gray tone values. Due to having such a configuration, it is possible to obtain an output result that is similar to that of conventional 1DLUT processing, even if interpolation calculation is performed in a 3DLUT. Tetrahedral interpolation was described above as an example, but eight-point interpolation processing for example achieves similar results, and it is sufficient to use two grid points in a positional relationship such that linear interpolation is performed based on only two grid points.

Here, an example in which a 1DLUT is mapped to a 3DLUT will be described. FIG. 6 is a diagram for describing an example in which a 1DLUT is mapped to a 3DLUT. For example, here, color material color data corresponding to a gray tone value of 0 in FIG. 5 is mapped to the origin of the "0-th" arrow in FIG. 6. Then, color material color data corresponding to a gray tone value of 8 in FIG. 5 is mapped to an adjacent grid point along the "0-th" arrow. Furthermore, color material color data corresponding to a gray tone value of 17 in FIG. 5 is mapped to an adjacent grid point along the "0-th" arrow. This mapping continues, and then color material color data corresponding to a gray tone value of 123 is mapped to the grid point 255 on the R axis, along the "0-th" arrow. Subsequently, color material color data corresponding to a gray tone value of 132 in FIG. 5 is mapped to an adjacent grid point along the G axis. Subsequently, color material color data corresponding to a gray tone value of 140 in FIG. 5 is mapped to an adjacent grid point along the "0-th" arrow. Hereafter, the aforementioned mapping continues up to a gray tone value of 255 in FIG. 5.

In the present embodiment, the 3DLUT is assumed to have 16×16×16=4096 grid points. Accordingly, 128 1DLUTs, each having 32 grid points as shown in FIG. 5 can be mapped. Regarding the method of mapping a 1DLUT to a 3DLUT, although mapping is performed on an RG plane that is defined by RG reference axes in FIG. 6, it may be performed on a BR plane. In other words, it need only be possible to consecutively map the aforementioned two adjacent grid points in a positional relationship such that linear interpolation is performed based on only two grid points. In the embodiment described above, the number of grids (32 grids) of the color material color conversion table for a monochrome image is more than the number of grids (16 grids) of each axis of the color material color development 3DLUT for a color image. It is therefore achieved to express the refined gradation which is required for the monochrome image.

In the aforementioned "information on the storage position of the color material color conversion table in the 3DLUT", storage positions are designated at addresses from the 0-th address up to and including the 127th address, as shown in FIG. 6 for example. In FIG. 6, color material color data from a 1DLUT corresponding to color tones is mapped to addresses on the G axis beginning at the position where R=G=0 (the origin), in an RG plane in the case where the B-axis value is fixed. As shown in FIG. 6, a total of 128 (i.e., 128 types of color tones) 1DLUTs from the 0-th line up to and including the 127th line are mapped to an RGB space.

Figure 7:
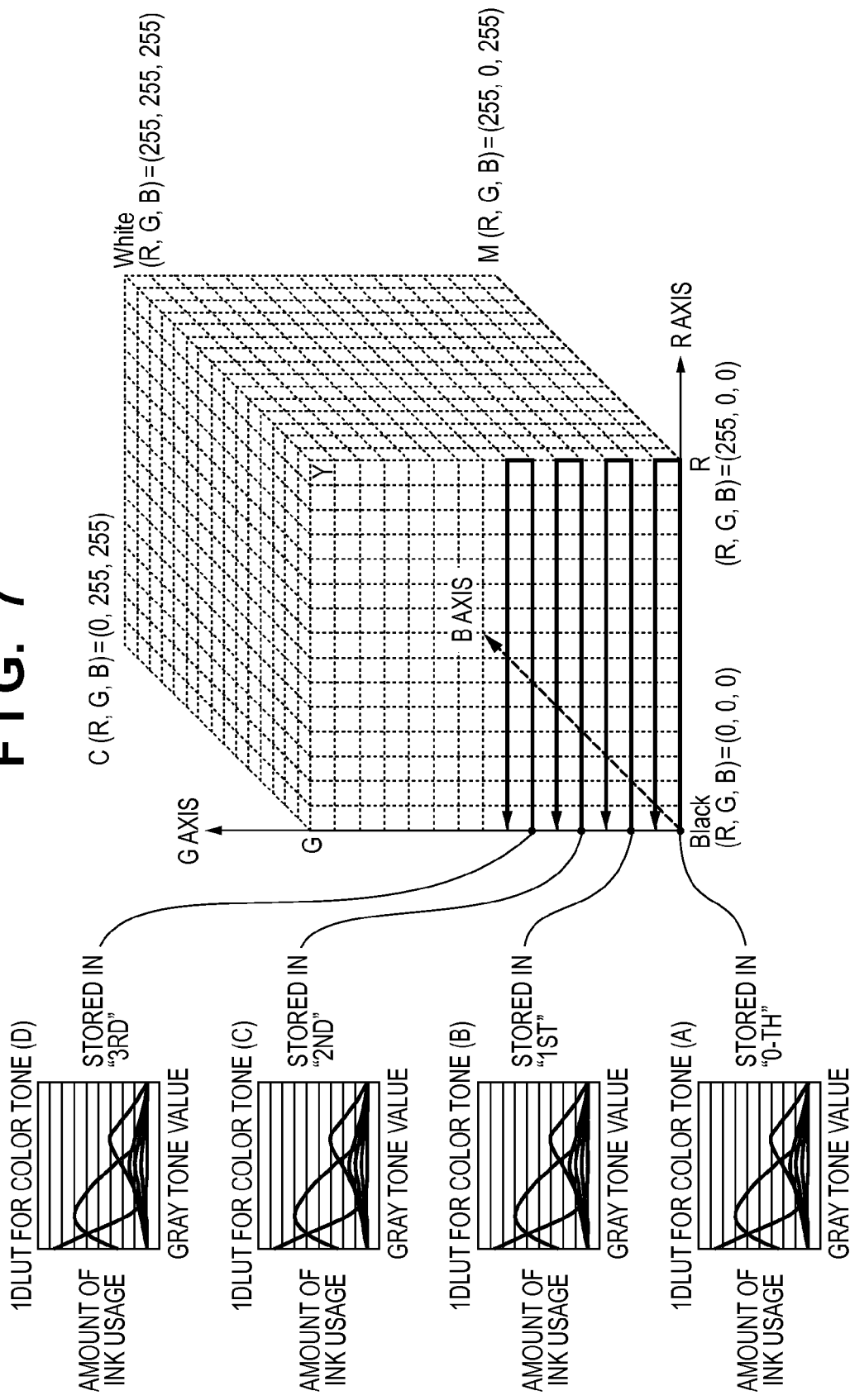
FIG. 7 is a diagram showing a concept of the 3DLUT to which the 1DLUT is mapped.

FIG. 7 is a diagram showing an illustration of a 3DLUT to which color material color conversion tables (1DLUTs) for four types of monochrome images have been mapped by the color material color coefficient generation unit 607 for example. As shown in FIG. 7, the 1DLUT for a monochrome image is mapped to grid points at the addresses in the 0-th to 3rd lines. Thus, in color material color development processing performed by the printer, color material color conversion tables (1DLUT) for a monochrome image for multiple types of color tones are mapped to one 3DLUT, and therefore color material color development processing for multiple types of color tones is performed with processing that is carried out one time. As a result, the speed of printing can be improved compared to the case where color material color development processing is carried out once for each tone.

Generation of One-to-Three Conversion Table in One-to-Three Conversion Unit

Next, the generation of a one-to-three conversion table to be used in the one-to-three conversion unit 605 will be described. The one-to-three conversion unit 605 performs color conversion of input monochrome data into RGB data, as the intermediate image data, with use of a one-to-three conversion table. Then, color material color data corresponding to RGB data resulting from color conversion is obtained from a 3DLUT such as that described in FIG. 6 and FIG. 7.

In the present embodiment, a table in which corresponding gray tone values and the RGB coordinate values thereof are mapped along the "0-th" arrow in FIG. 6 is generated as the one-to-three conversion table. In other words, the gray tone value of 0 that corresponds to the origin 0 is mapped to the RGB=(0, 0, 0) of that point. Then, the gray tone value of 16 that corresponds to an adjacent grid point on the R axis is mapped to the RGB=(34, 0, 0) of that point. The one-to-three conversion table indicated by "0-th" in FIG. 8 is obtained by continuing this type of mapping. In other words, change of RGB coordinate values along the "0-th" arrow in FIG. 6 is indicated in the "0-th" one-to-three conversion table in FIG. 8.

For example, when performing pattern printing processing with respect to monochrome image data, first, the one-to-three conversion unit 605 converts monochrome image data into RGB data. For example, the gray tone value of 17 is converted into RGB data where RGB=(34, 0, 0). Then, in the downstream color material color development processing unit 610 in the printer 107, color material color data mapped to the RGB=(25.5, 0, 0) in the 3DLUT is obtained. The color material color data that is obtained is of course color material color data that corresponds to the gray tone value of 17 in FIG. 5. Pixels of the image data converted by the one-to-three conversion table described above include pixels in which R, G, and B are not equaled to each other.

In the present embodiment, conversion in the one-to-three conversion unit 605 may be performed multiple times (equal to the number of the patterns) using one one-to-three conversion table, and a configuration is possible in which one-to-three conversion is performed using multiple one-to-three conversion tables. Also, in the present embodiment, a description was given regarding RGB data in which a predetermined number of color elements for expressing color in monochrome images and color images are expressed by three signal values, namely R, G, and B, but different elements that express colors may be furthermore added in addition to R, G, and B.

Embodiment 2

In Embodiment 1, a method was described in which input values not at grid points in the 3DLUT are calculated by interpolation calculation using adjacent grid points. In the present embodiment, a method of holding grid point data corresponding to all tone values of monochrome image data will be described. For example, if monochrome image data is assumed to have 256 tones in 8-bit data, data on 256 grid points are used as a table for monochrome images. In other words, grid point data for all 256 tone values of monochrome image data are held in a 3DLUT. In this case, grid point data in the 3DLUT need only be referenced, and interpolation calculation does not occur. Accordingly, when grid point data for monochrome image data is to be stored in the 3DLUT, it is not necessary to map that grid point data to adjacent grid point positions, as in the case described in Embodiment 1. In other words, grid point data of a 1DLUT can be mapped to random grid point positions in a 3DLUT. For example, if the number of grid points in the 3DLUT is 16×16×16=4096, 16 1DLUTs having 256 grid points each can be mapped to the 3DLUT, and in such a case, pattern printing of at most 16 types can be executed.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-182638, filed Aug. 21, 2012, which is hereby incorporated by reference herein in its entirety.

What is claimed is:

1. An image processing apparatus comprising:
   a setting unit configured to set a monochrome mode for printing a monochrome image on a printing medium or a color mode for printing a color image on the printing medium;
   an acquisition unit configured to acquire monochrome image data indicating a gradation value of a gray line, in a case where the monochrome mode is set by the setting unit;
   a conversion unit configured to convert the monochrome image data acquired by the acquisition unit into intermediate image data by using a first lookup table, wherein the first lookup table associates the gradation value of the gray line with a coordinate value of a color space; and
   a transfer unit configured to transfer the intermediate image data converted by the conversion unit to a determination unit configured to determine a color material amount, to print the monochrome image on the printing medium, by using a second lookup table, wherein the second lookup table associates the coordinate value of the color space with the color material amount,
   wherein a combination of the gradation value and the color material amount is assigned to the coordinate value of the color space, and wherein the first lookup table and the second lookup table are defined based on the color space.

2. The image processing apparatus according to claim 1, wherein the color space is defined by R, G, and B values, and the R, G, and B values are the same in the monochrome image data.

3. The image processing apparatus according to claim 1, wherein the combination of the gradation value and the color material amount is assigned to a coordinate value on a plane defined by two reference axes in the color space.

4. The image processing apparatus according to claim 3, wherein combinations of gradation values and color material amounts are aligned on the plane in order of gradations of the gray line.

5. The image processing apparatus according to claim 1, wherein the monochrome image data indicates a plurality of monochrome image patterns having different grey tones.

6. The image processing apparatus according to claim 1, further comprising an obtaining unit configured to, in a case where the color mode is set by the setting unit, obtain color image data indicating a value of each color element of the color space, and
   wherein the transfer unit transfers the color image data obtained by the obtaining unit to a second determination unit configured to determine the color material amount, to print the color image on the printing medium, by using a third lookup table, wherein the third lookup table associates a coordinate value of the color space with the color material amount.

7. The image processing apparatus according to claim 1, further comprising a holding unit configured to hold data of the color space in which the combination of the gradation value and the color material amount is assigned to the coordinate value of the color space.

8. The image processing apparatus according to claim 7, further comprising a generation unit configured to generate the data of the color space based on a predetermined 1D-LUT associating a gradation value with the color material amount, and
   wherein the holding unit holds the data of the color space generated by the generation unit.

9. The image processing apparatus according to claim 1, wherein the color material amount indicates an ink amount.

10. The image processing apparatus according to claim 1, wherein the determination unit further comprises a printing unit configured to perform printing based on the color material amount determined by the determination unit.

11. An image processing method comprising:
   setting a monochrome mode out of printing modes including a monochrome mode for printing a monochrome image on a printing medium and a color mode for printing a color image on the printing medium;
   acquiring monochrome image data indicating a gradation value of a gray line, in a case where the monochrome mode is set in the setting step;
   converting the monochrome image data acquired in the acquiring step into intermediate image data by using a first lookup table, wherein the first lookup table associates the gradation value of the gray line with a coordinate value of a color space; and
   determining, based on the intermediate image data converted in the converting step, a color material amount to print the monochrome image on the printing medium, by using a second lookup table, wherein the second lookup table associates the coordinate value of the color space with the color material amount,
   wherein a combination of the gradation value and the color material amount is assigned to the coordinate value of the color space, and wherein the first lookup table and the second lookup table are defined based on the color space.

12. The image processing method according to claim 11, wherein the color space is defined by R, G, and B values, and the R, G, and B values are the same in the monochrome image data.

13. The image processing method according to claim 11, wherein the combination of the gradation value and the color material amount is assigned to a coordinate value on a plane defined by two reference axes in the color space.

14. The image processing method according to claim 13, wherein combinations of gradation values and color material amounts are aligned on the plane in order of gradations of the gray line.

15. The image processing method according to claim 11, wherein the monochrome image data indicates a plurality of monochrome image patterns having different grey tones.

16. The image processing method according to claim 11, further comprising, in a case where the color mode is set in the setting step, obtaining color image data indicating a value of each color element of the color space, and wherein the color image data obtained in the obtaining step is transferred to determine the color material amount, to print the color image on the printing medium, by using a third lookup table, wherein the third lookup table associates a coordinate value of the color space with the color material amount.

17. The image processing method according to claim 11, further comprising holding data of the color space in which the combination of the gradation value and the color material amount is assigned to the coordinate value of the color space.

18. The image processing method according to claim 17, further comprising generating the data of the color space based on a predetermined 1D-LUT associating a gradation value with the color material amount, and wherein the data of the color space generated in the generating step is held.

19. The image processing method according to claim 11, wherein the color material amount indicates an ink amount.

20. The image processing method according to claim 11, wherein the determination step further comprises a printing based on the color material amount determined in the determination step.

21. A non-transitory computer-readable storage medium storing a program for causing a computer to:

set a monochrome mode out of printing modes including a monochrome mode for printing a monochrome image on a printing medium and a color mode for printing a color image on the printing medium;

acquire monochrome image data indicating a gradation value of a gray line, in a case where the monochrome mode is set by the setting unit;

convert the acquired monochrome image data into intermediate image data by using a first lookup table, wherein the first lookup table associates the gradation value of the gray line with a coordinate value of a color space; and determine, based on the intermediate image data a color material amount to print the monochrome image on the printing medium, by using a second lookup table, wherein the second lookup table associates the coordinate value of the color space with the color material amount, wherein a combination of the gradation value and the color material amount is assigned to the coordinate value of the color space, and wherein the first lookup table and the second lookup table are defined based on the color space.

22. An image processing apparatus comprising:

an acquisition unit configured to acquire a one-dimensional lookup table in which grey line gradations are mapped to coordinate values in a color material color space;

a first generation unit configured to generate a first lookup table by mapping coordinate values in a color space to the coordinate values in the color material color space in the one-dimensional lookup table; and a second generation unit configured to generate a second lookup table by replacing the coordinate values in the color material color space of the one-dimensional lookup table with the coordinate values in the color space, and wherein monochrome image data is converted into intermediate image data by using the second lookup table generated by the second generation unit, and then a color material amount is obtained from the intermediate image data by using the first lookup table.

* * * * *